United States Patent [19]

Gabrielson

[11] 3,919,487

[45] Nov. 11, 1975

[54] TELEPHONE INSTRUMENT DISCONNECT CIRCUIT

[75] Inventor: Bruce C. Gabrielson, Huntington Beach, Calif.

[73] Assignee: San/Bar Corporation, Santa Ana, Calif.

[22] Filed: June 14, 1974

[21] Appl. No.: 479,535

[52] U.S. Cl. .......................... 179/17 R; 179/175.3 R
[51] Int. Cl.[2] ........................ H04B 3/46; H04M 1/00
[58] Field of Search .......... 179/17 R, 81 R, 175.3 R

[56] References Cited

UNITED STATES PATENTS

| | | | |
|---|---|---|---|
| 3,150,237 | 9/1964 | Baldik et al. | 179/81 R |
| 3,471,649 | 10/1969 | Carle | 179/17 R |
| 3,773,986 | 11/1973 | Tremblay | 179/175.3 R |
| 3,790,723 | 2/1974 | Stewart | 179/175.3 R |
| 3,843,848 | 10/1974 | Cox | 179/175.3 R |

*Primary Examiner*—Douglas W. Olms
*Attorney, Agent, or Firm*—Jackson & Jones Law Corporation

[57] ABSTRACT

A telephone instrument disconnect circuit for use with multi-party lines is described. The disconnect circuit enables the connection or disconnection of a subscriber's telephone instrument from the line conductors normally connecting that instrument to a Central Office. The telephone instrument includes a conventional receiver (and transmitter) and a switch hook for coupling the receiver across the line conductors when the receiver is lifted off of the switch hook. The disconnect circuit includes switching means in the form of a relay connected in one of the line conductors between the Central Office and the telephone instrument. A relay control circuit is connected to the line conductors and to the telephone instrument for operating the relay to disconnect the instrument from the line conductors when the telephone receiver is off-hook and when a predetermined control signal is applied to the line conductors at the Central Office. The relay control circuit is also responsive to the receiver going on-hook to operate the relay to reconnect the line conductors to the instrument.

14 Claims, 2 Drawing Figures

TELEPHONE INSTRUMENT DISCONNECT CIRCUIT

BACKGROUND OF THE INVENTION

1. Field of the Invention

This invention relates generally to telephone disconnect circuits for use with multi-party lines and, in particular, circuits for selectively disconnecting a subscriber's telephone instrument when the instrument's receiver is off-hook or coupled across the telephone lines.

2. Description of the Prior Art

Multi-party telephone systems, involve a number of telephone stations or instruments which share a single pair of line conductors extending from a Central Office facility. The line conductors can be seized, e.g., to make an outgoing call by any one of the telephone instruments connected thereto. For example, a user or party taking the receiver of any instrument off-hook automatically ties up the multi-party line thus preventing the remaining instruments from using the same. In normal use the party hangs up the receiver upon the completion of a call thereby disconnecting the respective instrument from the telephone line. The line is thus freed for use by the other instruments. In the event that a party fails to hang up the receiver upon the completion of a call or in the event that the receiver is accidentally taken off-hook, the multi-party line is tied up until the instrument creating the problem is disconnected from the multi-party line; for example, by locating the off-hook receiver and placing it back in its switch hook.

A significant savings in cost, time and manpower could be effected by providing means at the Central Office for disconnecting an instrument that continues to seize the line after the completion of a call.

It is an object of the present invention to provide a circuit which permits a telephone instrument with its receiver off-hook to be disconnected from a multi-party line by the Central Office. It is a further object of this invention to provide a circuit which will automatically reconnect an instrument to the line when the receiver is placed back on-hook.

SUMMARY OF THE INVENTION

In accordance with the invention, a remote disconnect circuit is provided which enables the remote disconnection of a subscriber's telephone instrument from a pair of line conductors by which telephone service is normally extended from a Central Office. The telephone instrument includes a receiver, a pair of line terminals for connection to the pair of line conductors, and means such as a switch hook mechanism for selectively coupling the receiver to the line terminals and the telephone line conductors. The disconnect circuit includes switch means connected in at least one of the pair of line conductors between the Central Office and telephone instrument line terminals for selectively disconnecting or connecting the line terminals from the line conductors. The disconnect circuit further includes a first control means connected to the line conductors and responsive to the presence of the receiver across the line terminals (e.g., closed d.c. circuit) and to the application of a control signal on the line conductors for operating the switch means to disconnect the instrument line terminals from the line conductors. If desired, second control means may be connected to the line terminals and responsive to the disconnection of the receiver from the line terminals (e.g., opening of the d.c. circuit) for operating the switch means to reconnect the pair of line conductors to the line terminals.

The invention will be more readily appreciated by references to the following detailed description and the accompanying drawings.

DESCRIPTION OF THE PREFERRED EMBODIMENT

Figure 1:
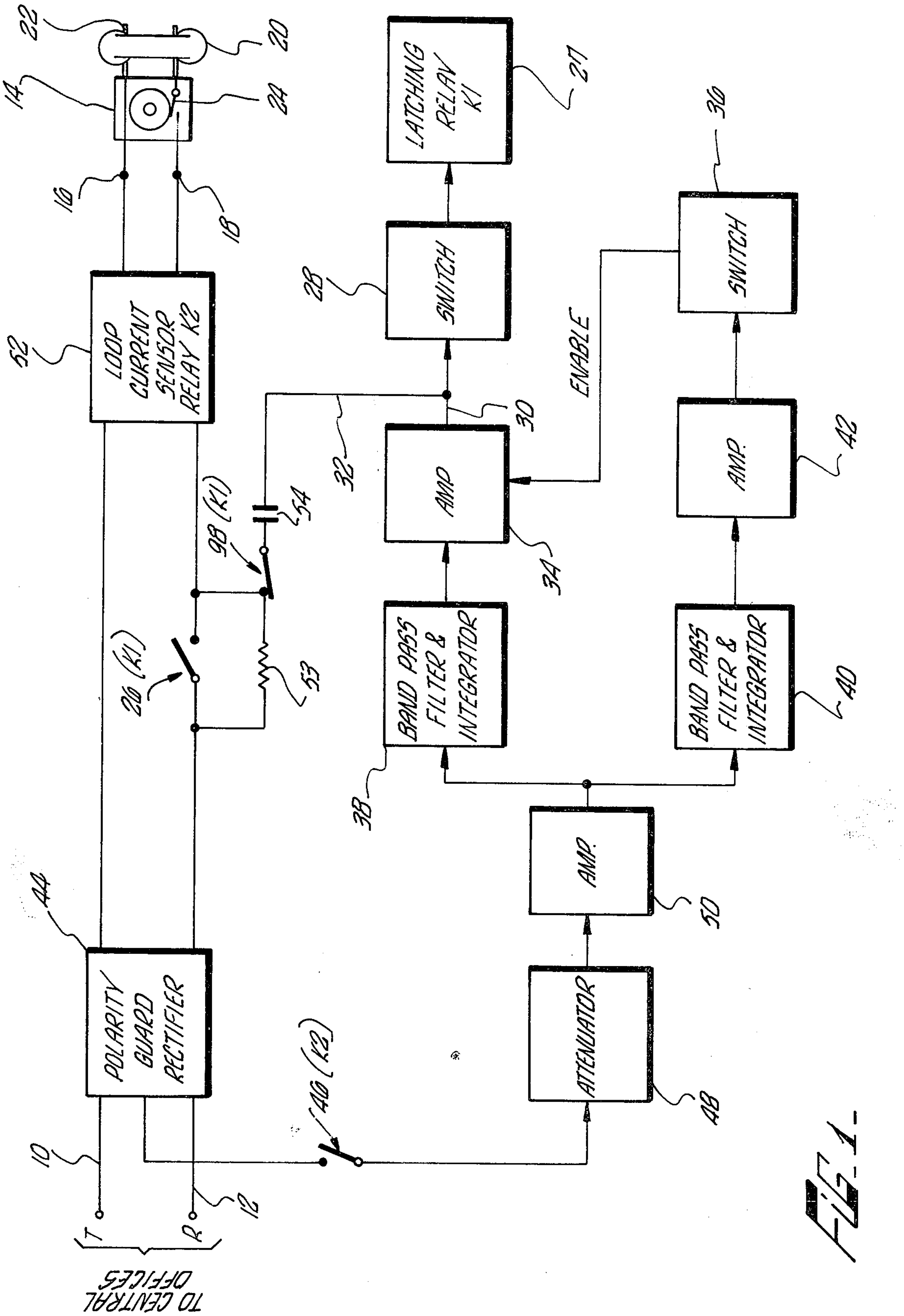
FIG. 1 is a block diagram of a disconnect circuit in accordance with the present invention.

Referring to the drawings, and particularly to FIG. 1, a pair of telephone line conductors 10 and 12 are connected between a Central Office (not shown) and line terminals 16 and 18 of subscriber's telephone instrument 14. The telephone instrument includes a receiver (and transmitter) 20 which is selectively connected across the line terminals 16 and 18 by means of a switch hook mechanism 22. The switch hook mechanism 22 includes a switch 24 which connects the telephone receiver across the line terminals when the receiver is in the off-hook condition to provide a closed d.c. circuit and disconnects the receiver from the line terminals to thereby open the d.c. circuit when the receiver is in the on-hook condition, i.e., resting on the switch hook mechanism.

Switch means in the form of relay contacts 26 of a relay 27 (K1) are connected in series with at least one of the pair of line conductors, i.e., the ring conductor 12, between the Central Office and the instrument line terminals 16 and 18. As will be described, the relay K1 selectively disconnects and connects the line terminals and thus the telephone instrument to the line conductors.

The relay K1 is a latching relay so that once operated or energized the relay contacts will remain open (or closed) until the relay is again energized. The relay K1 is controlled by an appropriate output signal from the switch 28. The switch 28 in turn responds to an appropriate output signal, for example, a high level signal of predetermined magnitude, on line 30 or 32 to actuate switch 28 and relay K1. Line 30 is the output circuit of an amplifier 34. The amplifier 34 provides the appropriate output signal to operate the switch 28 and relay K1, when enabled by switch 36, and upon the receipt of an appropriate output (high level) signal from a bandpass filter and integrator 38 (hereinafter referred to as filter). A bandpass filter and integrator 40 (hereinafter referred to as filter) and an amplifier 42 are also coupled to the switch 36 to actuate this switch and provide the enabling signal to the amplifier 34 as will be described.

The tip and ring conductors 10 and 12 are coupled to the input circuits of the filters 38 and 40 via a polarity guard rectifier 44, contacts 26 of a loop current detecting relay 52 (K2), attenuator 49 and amplifier 50. The relay K2 is also of the latching type. The filters 38 and 40 are tuned to pass signals within a narrow band of frequencies within the 500 to 2000 $H_z$ range. The two filters 38 and 40 are tuned to different frequency bands and preferably bands that do not represent harmonics of each other. For example, the filter 38 may be tuned to respond to a signal in the 1300–1500 $H_z$ band while the filter 40 may be tuned to respond to signals in the 1000–1200 $H_z$ band. An integrating circuit is included in each of the filters 38 and 40 so that an appropriate output signal (high level of predetermined magnitude) is not produced until a signal within the selected bandpass is present for a predetermined period of time, for example, twenty milliseconds. This dual frequency signal within the bandpass characteristics of both filters 38 and 40 and present on the line conductors for the time required by the integrating circuits of the filters to provide appropriate output signals is referred to as the control signal.

The relay K2 is connected in series with the tip and ring conductors to sense loop current, e.g., a closed d.c. circuit across the line conductors indicating the presence of the receiver 20 across the line conductors. Loop current through the relay K2 closes contact 46 thereby enabling the control means including the filters 38 and 40 and switches 28 and 36 to respond to the presence of the dual frequency control signal on the line conductors. The control signal responsive circuit, e.g., attenuator 48, amplifier 50, filters 38 and 40, amplifiers 34 and 42, switch 36, and the loop current detector relay K2 are sometimes referred to hereinafter as the first control means. The switch 28 and latching relay K2 are sometimes hereinafter referred to as switch means for selectively disconnecting or connecting the line terminals from the line conductors.

The presence of the control signal on the lines 10 and 12 with the K2 relay contacts closed provides output signals from the filters 38 and 40 and the switches 28 and 36 to operate the latching relay K1. This action disconnects the telephone instrument line terminals 16 and 18 from the line conductors. The line conductors are now ready for use by another subscriber instrument.

The operator at the Central Office need not determine which telephone instrument is in the off-hook condition. The operator need only apply a predetermined control signal; for example, a double frequency signal for a predetermined period of time, to the line conductors after it has been determined that one of the instrument receivers is off-hook and the conversation has been terminated. The application of the control signal to the line conductors actuates the disconnect circuit of FIG. 1 which is connected to the off-hook instrument. If more than one telephone instrument (connected to the same line conductors) has its telephone off-hook, then each of the off-hook instruments will be disconnected by the respective disconnect circuit, provided, of course, that the disconnect circuits respond to the same control signal.

To reconnect the instrument 14 to the line conductors, it is only necessary to hang up the receiver 20 and thereby provide an open d.c. circuit across the line terminals 16 and 18. A voltage pulse is applied to the line 32 via the Central Office battery, the ring conductor 12, when the switch contacts 24 are opened by the receiver 20 going on-hook. This pulse is applied through resistor 53, closed switch contact 98 of relay K1 and d.c. isolation capacitor 54 to actuate the switch 28 and provide an appropriate output signal to operate the relay K1 and close contacts 26. The capacitor 54, resistor 53 and line 32 for operating the switching means to reconnect the line terminals to the line conductors in response to the receiver going on-hook are sometimes referred to hereinafter as second control means.

It should be noted that while the control signal utilized in the preferred embodiment of FIG. 1 is a dual frequency signal, the control signal could be any other appropriate signal such as a single frequency signal having predetermined time duration or an appropriate digital signal. The control signal need only be distinguishable from normal voice or data signals present on the line to prevent false operation of the disconnect circuit.

Figure 2:
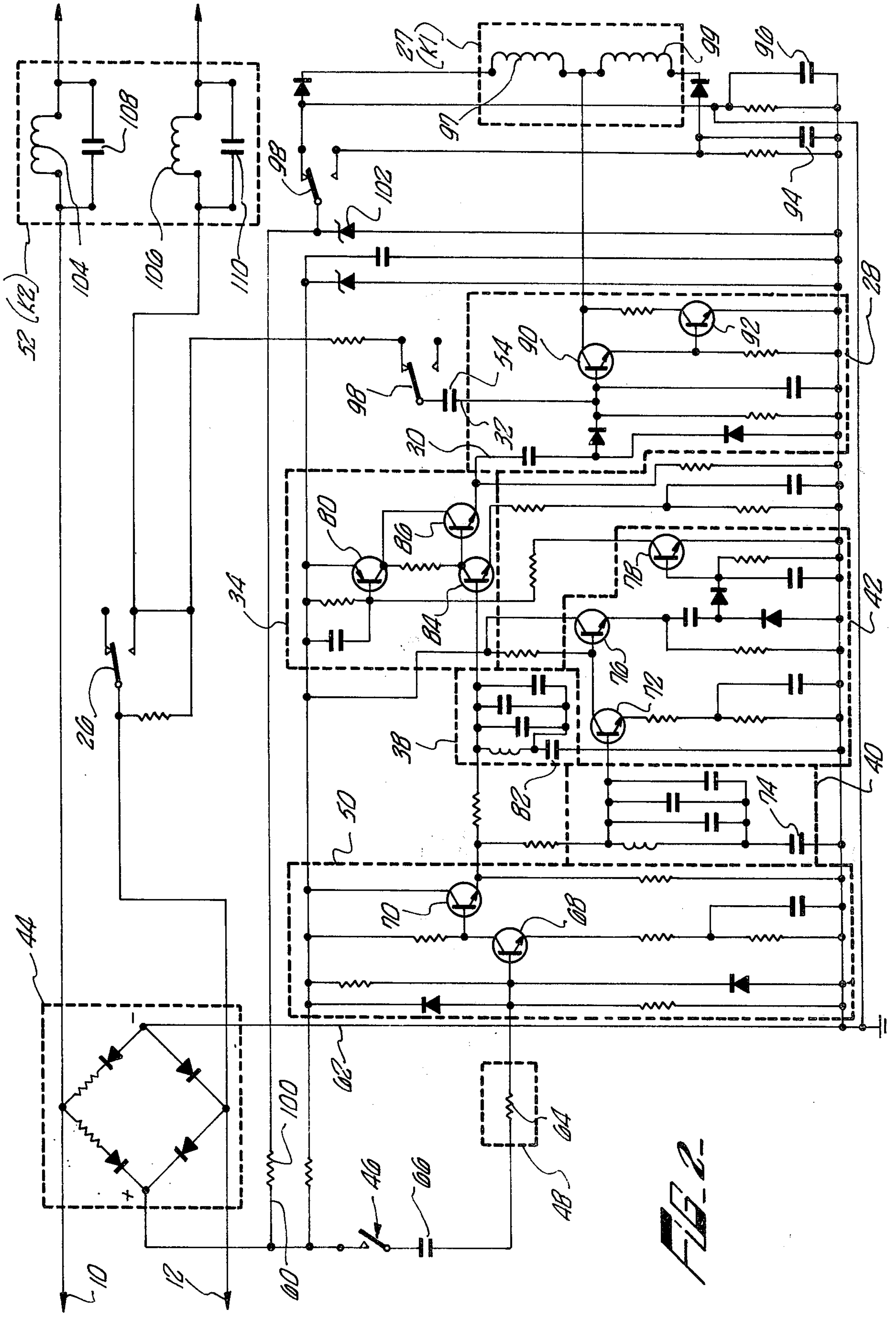
FIG. 2 is a schematic circuit diagram of components which may be used in the blocks of FIG. 1.

Referring now to FIG. 2, a schematic circuit diagram illustrates the electronic components by conventional symbols that may be used in the blocks of FIG. 1.

The polarity guard rectifier 44 includes a conventional bridge rectifier circuit connected across the line conductors 10 and 12 to provide a d.c. voltage output on leads 60 and 62. The attenuator 48 includes a resistor 64 which is connected to the positive lead 60 of the bridge rectifier by a d.c. isolation capacitor 66 and the contacts 46 of the K2 relay. The amplifier 50 includes a pair of transistors 68 and 70, bias resistors and transient voltage protection diodes, as illustrated. The filter 40 includes a coil and three capacitors connected as illustrated for providing a high Q tank circuit which applies an appropriate output signal to the base of a transistor 72 of amplifier 42 when the input signal to the filter falls within the predetermined bandpass for a predetermined period. The value of an integrating capacitor 74 of the filter 40 determines the length of time that the input signal must be present before the filter will produce the appropriate output signal.

The amplifier 42 amplifies the output signal from the filter and integrator 40 by means of transistors 76 and 78. Suitable bias resistors, capacitors and diodes are also included in the amplifier circuit as shown. The amplified output signal from the filter and integrator 40 is applied to the base electrode of a transistor 78 of the switch 36. The transistor 78, when turned on by the output signal from the amplifier 42 enables amplifier 34 by applying negative bias voltage to the base electrode of transistor 80 to render it conductive. The filter 38 includes a coil and three capacitors to form a high Q tank circuit as shown. An integrating capacitor 82 is also included in the filter 38 as shown.

Upon receipt of a signal from amplifier 50 which falls within the predetermined bandpass characteristics of filter 38 for the time determined by the integrating capacitor 82, an appropriate output signal is supplied to the base electrode of transistor 84 to turn on transistors 84 and 86 of the amplifier 34. Bias voltage is supplied to the transistors 84 and 86 via the transistor 80 as shown.

A signal having frequencies which fall within the bandpass characteristics of filters 38 and 40 for the predetermined period of time required by the respective integrating capacitors 82 and 74 provides a high level output signal of suitable magnitude on the emitter electrode of transistor 86 to turn on a pair of transistors 90 and 92 of the switch 28. The transistor 92 discharges storage capacitors 94 and 96 through the coils 97 and 99 of relay K1 to operate this relay and cause the switch contacts thereof to reverse their position.

Only one of the capacitors 94 or 96 is charged at any one time depending upon the position of switch contacts 98 of the relay K1. These capacitors 94 and 96 are charged by line current via positive lead 60, current limiting resistor 100 and negative lead 62. A zener diode 102 regulates the voltage supplied the capacitors and the transistors in a well known manner. The current drawn by the disconnect circuit is small, e.g., of the order of 0.5 ma. A time delay of approximately 20 seconds is required to charge the capacitors 94 or 96 connected to the line conductors.

The relay 52 (K2) is illustrated as including a pair of coils 104 and 106 connected in series with the tip and ring conductors 10 and 12 as shown to provide a balanced impedance across the telephone line conductors. A pair of capacitors 108 and 110 may be connected in parallel with the K2 relay coils to provide a low impedance path for voice signals. The coils of the K2 relay are energized to close contacts 46 in response to d.c. line current flowing from the Central Office battery through the telephone receiver in its off-hook condition.

While the current for operating the transistors, etc. of the disconnect circuit is drawn from the Central Office power supply via the line conductors in the circuit of FIG. 2 it should be noted that a battery or other suitable power supply may be used if desired.

The disconnect circuit of FIGS. 1 and 2 is responsive only to the presence of loop current in the line conductors, for example, caused by the receiver being off-hook and to the application of a predetermined control signal on the line conductors to disconnect the instrument line terminals from the line conductors. The disconnect circuit reconnects the line terminals to the line conductors only when the receiver is placed back on-hook, e.g., disconnected from the line terminals.

There has thus been described a simple remote disconnect circuit for permitting a Central Office operator to disconnect an "off-hook" telephone instrument from a multi-party line. The instrument may be automatically reconnected to the line when the receiver is hung up. Various modifications to the preferred embodiment described will be apparent to those skilled in the art.

What is claimed is:

1. In a remote disconnect circuit for enabling the disconnection of subscriber's telephone instrument from a pair of line conductors by which telephone service is normally extended from a Central Office, the telephone instrument including a receiver, a pair of line terminals for connection to the pair of line conductors and means for selectively coupling the receiver to the pair of line terminals to provide a closed d.c. circuit across the line terminals, the disconnect circuit comprising:

switch means connected in at least one of said pair of line conductors between the Central Office and the telephone instrument line terminals for selectively disconnecting or connecting at least one of the line terminals from the respective line conductor; and first control means connected to the line conductors and responsive to a closed d.c. circuit across the line terminals and to the application of a control signal on the line conductors for operating said switch means to disconnect the telephone instrument line terminals from the line conductors only when the telephone instrument's receiver is connected across the line terminals.

2. The disconnect circuit as defined in claim 1 including second control means connected to the line terminals and responsive to the opening of the d.c. circuit across line terminals for operating the switch means to reconnect said at least one of the line conductors to the respective line terminals.

3. The disconnect circuit as defined in claim 1 wherein the first control means includes a control signal detector having an input and an output and arranged to provide an output signal in the output thereof in response to the application of the control signal to the input thereof, means coupled between the switch means and the output of the control signal detector for operating the switch means in response to the output signal and means for coupling the input circuit of the control signal detector to the line conductors.

4. The disconnect circuit as defined in claim 3 wherein the first control means further includes means for detecting loop current in the line conductors when the conductors are interconnected to thereby sense the presence of a closed circuit across the line terminals and for coupling the input circuit of the control signal detector to the line conductors when loop current is detected.

5. The disconnect circuit as defined in claim 3 wherein the switch means includes a first latching relay with contacts connected in series with at least one of the line conductors for disconnecting and connecting the line conductors to the instrument terminates when the contacts are open and closed respectively.

6. The disconnect circuit as defined in claim 5 wherein the means for detecting loop current in the line conductors includes a second latching relay having at least one coil connected in series with the line conductors.

7. The disconnect circuit as defined in claim 4 wherein the control signal detector includes at least one bandpass filter, the bandpass filter being arranged to provide an output signal in response to the control signal having a frequency within the bandpass characteristics of said filter.

8. The disconnect circuit as defined in claim 7 wherein said filter includes integrating means for providing an output signal only in response to a control signal having a frequency with the bandpass characteristics of the filter for a predetermined period of time.

9. The disconnect circuit as defined in claim 7 wherein the control signal detector includes a pair of bandpass filters and integrators, the filters and integrators having different bandpass characteristics and arranged to provide an output signal only in response to a control signal having a frequency within each bandpass characteristic for a predetermined period of time.

10. The disconnect circuit as defined in claim 4 including a bridge rectifier network connected across the line for providing bias voltages for the first and second control means.

11. In a telephone system for permitting an operator at a Central Office to disconnect a telephone instrument which has seized a party line from the pair of line conductors through which service is extended to a plurality of instruments by applying a control signal to the line conductors at the Central Office, the Central Office having a source of direct current which is connected to the pair of line conductors to cause current to flow through the conductors and the instrument when the line conductors are seized by a telephone instrument, each telephone instrument including a receiver, a pair of line terminals for connection to the line conductors and a switch for selectively coupling the receiver to the line terminals to thereby seize the party line, a remote disconnect circuit connected individually between the Central Office and each telephone instrument, each circuit comprising:

switch means connected in at least one of said pair of line conductors between the Central Office and the telephone instrument line terminals for selectively disconnecting or connecting at least one of the line terminals to the respective line conductor;

first control means connected to the line conductors and responsive to the seizure of the line conductors by the instrument's receiver and to the presence of a control signal on the line conductors for operating the switch means to disconnect at least one of the instrument's line terminals from the respective line conductor; and second control means connected to the line terminals and responsive to the interruption of line current caused by the disconnection of the receiver from the line terminals for operating the switch means to reconnect said at least one of the line conductors to the respective line terminal so that each terminal is connected to its respective line conductor.

12. The disconnect circuit as defined in claim 11 wherein the switch means includes a first latching relay with contacts connected in series with at least one of the line conductors so that consecutive operation of the first relay disconnects and then connects said at least one of the line conductors to the respective instrument's line terminal.

13. The disconnect circuit as defined in claim 12 wherein the first control means includes a second latching relay connected in series with the line conductors, the seocnd relay being arranged to be operated by d.c. current flow through the line conductors when the line conductors are seized by the instrument's receiver.

14. The disconnect circuit as defined in claim 13 wherein the second control means includes means coupled to the line conductors between the Central Office and the switch means for operating the first latching relay when the switch means has disconnected said at least one of the line terminals from the respective line conductor and when the instrument's receiver is disconnected from the line terminals.

* * * * *